US010469461B1

(12) United States Patent
Singh et al.

(10) Patent No.: US 10,469,461 B1
(45) Date of Patent: Nov. 5, 2019

(54) SECURING END-TO-END VIRTUAL MACHINE TRAFFIC

(71) Applicant: Juniper Networks, Inc., Sunnyvale, CA (US)

(72) Inventors: Avinash Kumar Singh, Bangalore (IN); Sachin Mutalik Desai, Bangalore (IN); Vaibhav Agarwal, Bangalore (IN); Mohit Joshi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 244 days.

(21) Appl. No.: 15/730,356

(22) Filed: Oct. 11, 2017

(51) Int. Cl.
*H04L 29/06* (2006.01)
*G06F 9/455* (2018.01)
*H04L 12/813* (2013.01)

(52) U.S. Cl.
CPC ...... *H04L 63/0428* (2013.01); *G06F 9/45558* (2013.01); *H04L 63/029* (2013.01); *H04L 63/06* (2013.01); *H04L 63/0876* (2013.01); *G06F 2009/45587* (2013.01); *H04L 47/20* (2013.01); *H04L 63/20* (2013.01)

(58) Field of Classification Search
CPC ............... H04L 63/0428; H04L 63/029; H04L 63/0876; H04L 63/20; H04L 47/20; G06F 9/45558; G06F 2009/45587
See application file for complete search history.

(56) References Cited

U.S. PATENT DOCUMENTS

| 2014/0226820 | A1* | 8/2014 | Chopra ............... | H04L 63/0485 380/277 |
| 2016/0028658 | A1 | 1/2016 | Lambeth et al. | |
| 2016/0119299 | A1* | 4/2016 | Amulothu ........... | H04L 63/0485 380/255 |
| 2017/0346854 | A1* | 11/2017 | Kumar ................ | H04L 63/0428 |
| 2018/0145951 | A1* | 5/2018 | Varadarajan .......... | H04W 12/02 |

OTHER PUBLICATIONS

Cisco White Paper, "WAN MACsec Deployment White Paper," http://www.cisco.com/c/dam/en/us/td/docs/solutions/CVD/Aug2016/WP-WAN-MACsecDep-Aug2016.pdf, Aug. 2016, 48 pages.

* cited by examiner

*Primary Examiner* — Hee K Song
(74) *Attorney, Agent, or Firm* — Harrity & Harrity, LLP

(57) ABSTRACT

A device may receive a packet from a first endpoint that is destined for a second endpoint. The first endpoint may be hosted on the device. The device may determine whether a secure session exists between the first endpoint and the second endpoint. The secure session may permit encrypted traffic to be exchanged between the first endpoint and the second endpoint. The device may process the packet using a set of rules after determining whether the secure session exists between the first endpoint and the second endpoint. The device may encrypt the packet using security information associated with the secure session after determining that the secure session exists, or establishing the secure session when the secure session does not exist. The device may provide the packet toward the second endpoint after encrypting the packet.

20 Claims, 11 Drawing Sheets

SECURING END-TO-END VIRTUAL MACHINE TRAFFIC

BACKGROUND

Cloud computing is a model for enabling access to shared pools of configurable resources. For example, the configurable resources can include computer networks, servers, storage, applications, services, and/or the like. The configurable resources can be rapidly provisioned with minimal management effort and/or over the Internet. Cloud computing may include the use of distributed devices (e.g., physically distributed devices) to provide the configurable resources.

SUMMARY

According to some possible implementations, a device may include one or more memories, and one or more processors, communicatively coupled to the one or more memories, to receive a packet from a first endpoint that is destined for a second endpoint. The first endpoint may be hosted on the device. The one or more processors may determine whether a secure session exists between the first endpoint and the second endpoint. The secure session may permit encrypted traffic to be exchanged between the first endpoint and the second endpoint. The one or more processors may process the packet using a set of rules after determining whether the secure session exists between the first endpoint and the second endpoint. The one or more processors may encrypt the packet using security information associated with the secure session after determining that the secure session exists, or establishing the secure session when the secure session does not exist. The one or more processors may provide the packet toward the second endpoint after encrypting the packet.

According to some possible implementations, a non-transitory computer-readable medium may store one or more instructions that, when executed by one or more processors, cause the one or more processors to receive a packet from a first endpoint that is destined for a second endpoint. The first endpoint may be local to a device. The second endpoint may be remote to the device. The one or more instructions, when executed by the one or more processors, may cause the one or more processors to determine whether a secure session exists between the first endpoint and the second endpoint. The secure session may be associated with security information that is to be used to encrypt the packet. The one or more instructions, when executed by the one or more processors, may cause the one or more processors to process the packet using a set of rules prior to encrypting the packet and after determining whether the secure session exists between the first endpoint and the second endpoint. The one or more instructions, when executed by the one or more processors, may cause the one or more processors to encrypt the packet using the security information associated with the secure session after processing the packet using the set of rules. The one or more instructions, when executed by the one or more processors, may cause the one or more processors to provide the packet toward the second endpoint after encrypting the packet. The packet may be provided toward the second endpoint via an underlying tunneling network between the device and another device hosting the second endpoint.

According to some possible implementations, a method may include receiving, by a device, a packet from a first endpoint that is destined for a second endpoint. The first endpoint may be hosted on the device. The second endpoint may be hosted on another device. The method may include determining, by the device, whether a secure session exists between the first endpoint and the second endpoint. The secure session may permit encrypted traffic to be exchanged between the first endpoint and the second endpoint. The method may include marking, by the device, the packet for encryption after determining whether the secure session exists between the first endpoint and the second endpoint. The packet may be encrypted using security information associated with the secure session. The method may include processing, by the device, the packet using a set of rules after marking the packet for encryption. The process may include encrypting, by the device, the packet using the security information associated with the secure session after processing the packet using the set of rules and after determining that the secure session exists, or establishing the secure session when the secure session does not exist. The method may include providing, by the device, the packet toward the second endpoint after encrypting the packet. The packet may be provided via an underlying tunneling network between the device and the other device.

DETAILED DESCRIPTION

The following detailed description of example implementations refers to the accompanying drawings. The same reference numbers in different drawings may identify the same or similar elements.

A data center architecture may include various network devices (e.g., switches, routers, hypervisors, etc.). Traffic exchanged between network devices in a data center architecture may be susceptible to a man-in-the-middle attack or another type of attack if the traffic is unsecured. In addition, a data center may be implemented in a multi-tenant environment where virtual machines hosted on network devices are associated with different tenants. Traffic exchanged between virtual machines hosted on the network devices of one tenant may be read by virtual machines of another tenant if the traffic is unsecured. Network devices (e.g., hosts) in a multi-tenant environment may lack a technique for securing traffic between virtual machines hosted on the network devices (e.g., securing the traffic at layer 2 of the Open Systems Interconnection (OSI) model). For example, a first virtual machine hosted on a first network device may lack a technique for securing traffic destined for a second virtual machine hosted on a second network device, such that other virtual machines on the same or different network devices cannot read the traffic.

Some implementations, described herein, provide a network device (e.g., a host) that is capable of securing traffic between virtual machines on different network devices (e.g., at layer 2). In this way, the network device may provide end-to-end network security between virtual machines associated with the same tenant network or associated with a different tenant network. This improves security between virtual machines by permitting traffic to be secured as the traffic is exchanged between virtual machines. Further, this permits virtual machines associated with different tenants to be securely hosted on the same network device.

Figure 1:
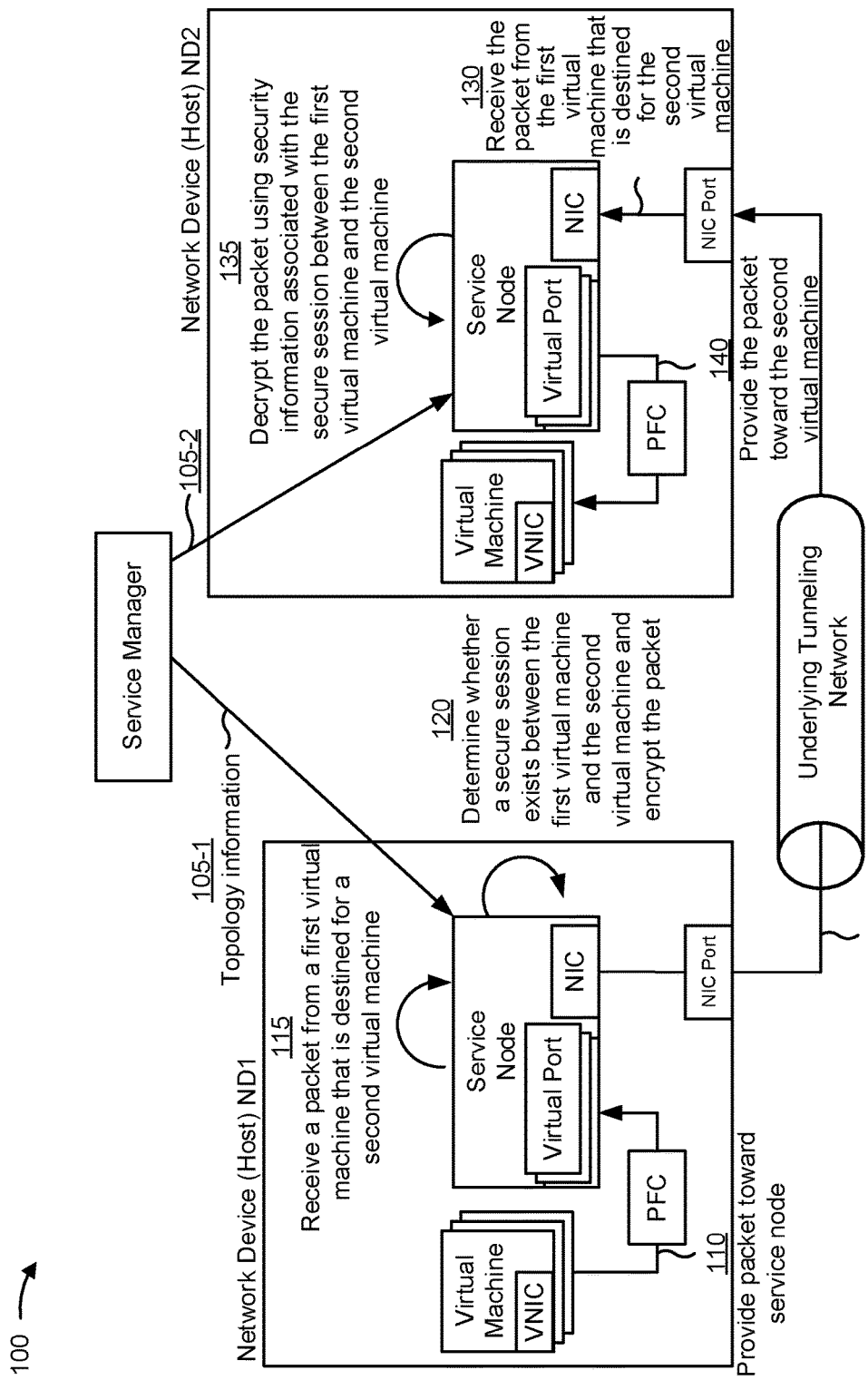
FIG. 1 is a diagram of an overview of an example implementation described herein.

FIG. 1 is a diagram of an overview of an example implementation 100 described herein. As shown in FIG. 1, example implementation 100 may include a service manager, and two network devices (e.g., shown as network device ND1 and network device ND2). Further, each network device may include a set of virtual machines, a service node, and a packet forwarding component (PFC). Although FIG. 1 shows two network devices, in practice there may be tens, hundreds, thousands, etc. of network devices.

As further shown in FIG. 1, and by reference numbers 105-1 and 105-2, a service manager may provide topology information to the service nodes associated with network devices ND1 and ND2. For example, the topology information may identify network devices that are associated with a network and/or that are available, virtual machines associated with network devices on a network, service nodes associated with network devices on a network, and/or the like.

As further shown in FIG. 1, and by reference number 110, a first virtual machine (e.g., a virtual machine that is local to network device ND1) may provide a packet toward a first service node associated with network device ND1. In some implementations, the first virtual machine may provide the packet toward the service node via a virtual network interface card (VNIC) associated with the first virtual machine. Additionally, or alternatively, the first virtual machine may provide the packet toward the PFC, which may provide the packet to the first service node via a virtual port associated with the first service node. The service node may include multiple virtual ports. For example, the service node for a network device may include a virtual port for each virtual machine associated with the network device to permit the service node to exchange traffic with each virtual machine.

As further shown in FIG. 1, and by reference number 115, a first service node (e.g., a service node that is local to network device ND1) may receive a packet from a first virtual machine that is destined for a second virtual machine. For example, the first service node may receive a packet from the first virtual machine destined for a second virtual machine. In example implementation 100, assume that the second virtual machine is remote to network device ND1 (e.g., that is hosted on network device ND2).

As further shown in FIG. 1, and by reference number 120, the first service node may determine whether a secure session exists between the first virtual machine and the second virtual machine, and may encrypt the packet. For example, the first service node may determine whether a media access control (MAC) security (MACsec) key agreement (MKA) session has been established between the first virtual machine and the second virtual machine. In some implementations, the first service node may determine whether a secure session exists by performing a lookup of information that indicates whether a secure session exists between the first virtual machine and the second virtual machine using information that identifies a source MAC address for the packet (e.g., a MAC address of the first virtual machine), a destination MAC address for the packet (e.g., a MAC address of the second virtual machine), and/or the like. Although implementations are described herein with respect to MAC addresses, some implementations may use other types of information, such as an Internet protocol (IP) address of a source and/or destination of the packet.

If the first service node determines that the secure session exists, the first service node may perform an action related to providing the packet toward the second virtual machine. For example, if the first service node determines that an MKA session exists between the first virtual machine and the second virtual machine, the first service node may identify a corresponding encryption key (e.g., an encryption key derived from a pre-shared key (PSK)) associated with the MKA session and may encrypt the packet using the encryption key derived from the PSK and other information related to the packet (e.g., a source MAC address, a destination MAC address, etc.).

Conversely, if the first service node determines that the secure session does not exist, the first service node may perform an action related to establishing the secure session. For example, if the first service node determines that an MKA session does not exist between the first virtual machine and the second virtual machine, the first service node may block the first virtual machine from providing additional packets. Additionally, or alternatively, the first service node may establish an MKA session by using, for example, extensible authentication protocol over local area network (EAPoL) to exchange information with a second service node associated with network device ND2 (e.g., the network device that is hosting the destination virtual machine for the packet). In this case, after establishing the MKA session, the first service node may store information identifying the encryption key (and/or decryption key) derived from the PSK associated with the MKA session between the first virtual machine and the second virtual machine and the first service node may use the encryption key and other information related to the packet (e.g., a source MAC address, a destination MAC address, etc.) to encrypt the packet.

As further shown in FIG. 1, and by reference number 125, the first service node may provide the packet toward the second virtual machine (e.g., after encrypting the packet using the encryption key and the other information related to the packet). For example, the first service node may provide the packet via a network interface card (NIC) associated with the first service node, a NIC port associated with network device ND1, and an underlying tunneling network between network device ND1 and network device ND2.

As further shown in FIG. 1, and by reference number 130, a second service node (e.g., a service node that is local to network device ND2) may receive a packet from the first virtual machine that is destined for the second virtual machine. For example, the second service node may receive the packet from the first virtual machine (e.g., a virtual machine that is remote to network device ND2) via a NIC port associated with network device ND1 and a NIC associated with the second service node. Continuing with the previous example, the packet may be destined for the second virtual machine (e.g., a virtual machine that is local to network device ND2 and remote to network device ND1).

As further shown in FIG. 1, and by reference number 135, the second service node may decrypt the packet using security information associated with the secure session between the first virtual machine and the second virtual machine. For example, the second service node may decrypt the packet using a decryption key derived from a PSK associated an MKA session between the first virtual machine and the second virtual machine and other information related to the packet (e.g., a source MAC address, a destination MAC address, etc.). In some implementations, the second service node may identify the security information by performing a lookup. For example, the second service node may perform a lookup of a decryption key using information identifying a destination and source MAC address associated with the packet, layer 2 information related to a source and/or destination of a packet, and/or the like.

As further shown in FIG. 1, and by reference number 140, the second service node may provide the packet toward the second virtual machine (e.g., a virtual machine that is local to network device ND2 and remote to network device ND1). In some implementations, the second service node may provide the packet via a virtual port of the second service node to a PFC associated with network device ND2. In this case, the PFC may provide the packet to the second virtual machine via a VNIC associated with the second virtual machine.

In this way, a network device may provide end-to-end network security between virtual machines associated with the same tenant network or associated with different tenant networks. This improves security between virtual machines by permitting traffic to be secured as the traffic is exchanged between the virtual machines. Further, this permits virtual machines associated with different tenants to be securely hosted on the same network device.

As indicated above, FIG. 1 is provided merely as an example. Other examples are possible and may differ from what was described with regard to FIG. 1.

Figure 2:
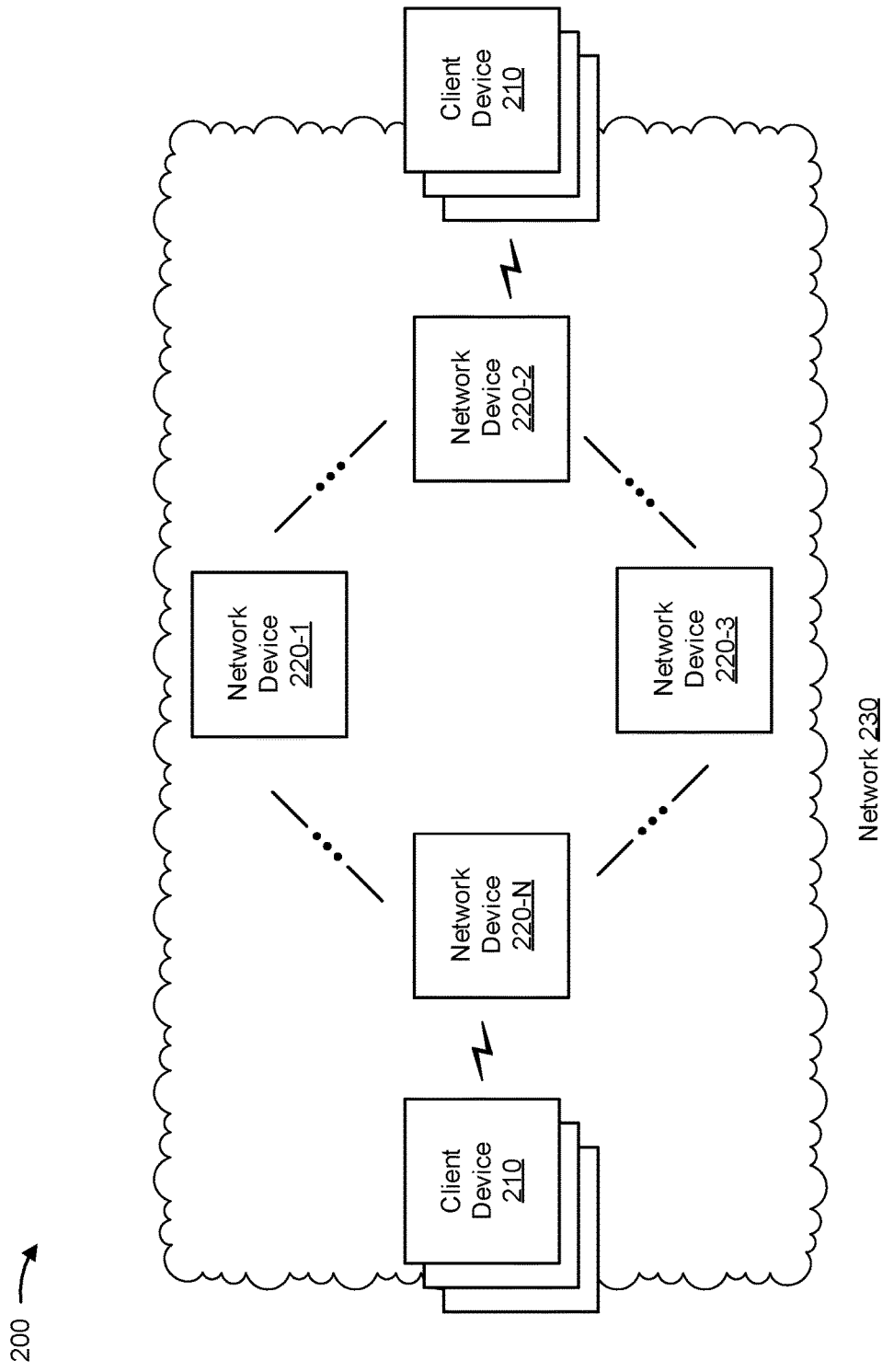
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a set of client devices 210 and one or more network devices 220-1 through 220-N(N≥1) (hereinafter referred to collectively as "network devices 220," and individually as "network device 220"). Devices of environment 200 may interconnect via wired connections, wireless connections, or a combination of wired and wireless connections.

Client device 210 includes one or more devices capable of receiving, generating, storing, processing, and/or providing information associated with a packet exchanged among virtual machines. For example, client device 210 may include a mobile phone (e.g., a smart phone, a radiotelephone, etc.), a laptop computer, a desktop computer, a tablet computer, a handheld computer, a gaming device, a wearable communication device (e.g., a smart wristwatch, a pair of smart eyeglasses, etc.), or a similar type of device. In some implementations, client device 210 may receive a report generated by network device 220 related to a packet exchanged among virtual machines, as described in more detail elsewhere herein.

Network device 220 includes one or more devices (e.g., one or more traffic transfer devices) capable of receiving, providing, storing, generating, and/or processing information related to a packet exchanged among virtual machines. For example, network device 220 may include a firewall, a router, a gateway, a switch, a hub, a bridge, a reverse proxy, a server (e.g., a proxy server), a security device, an intrusion detection device, a load balancer, or a similar device. In some implementations, network device 220 may determine whether a secure session exists between two or more virtual machines exchanging a packet, as described in more detail elsewhere herein. Additionally, or alternatively, network device 220 may encrypt or decrypt the packet using security information related to the secure session between the two or more virtual machines exchanging the packet, as described in more detail elsewhere herein. In some implementations, network device 220 may be a physical device implemented within a housing, such as a chassis. In some implementations, network device 220 may be a virtual device implemented by one or more computer devices of a cloud computing environment or a data center.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of cellular network, etc.), a public land mobile network (PLMN), local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
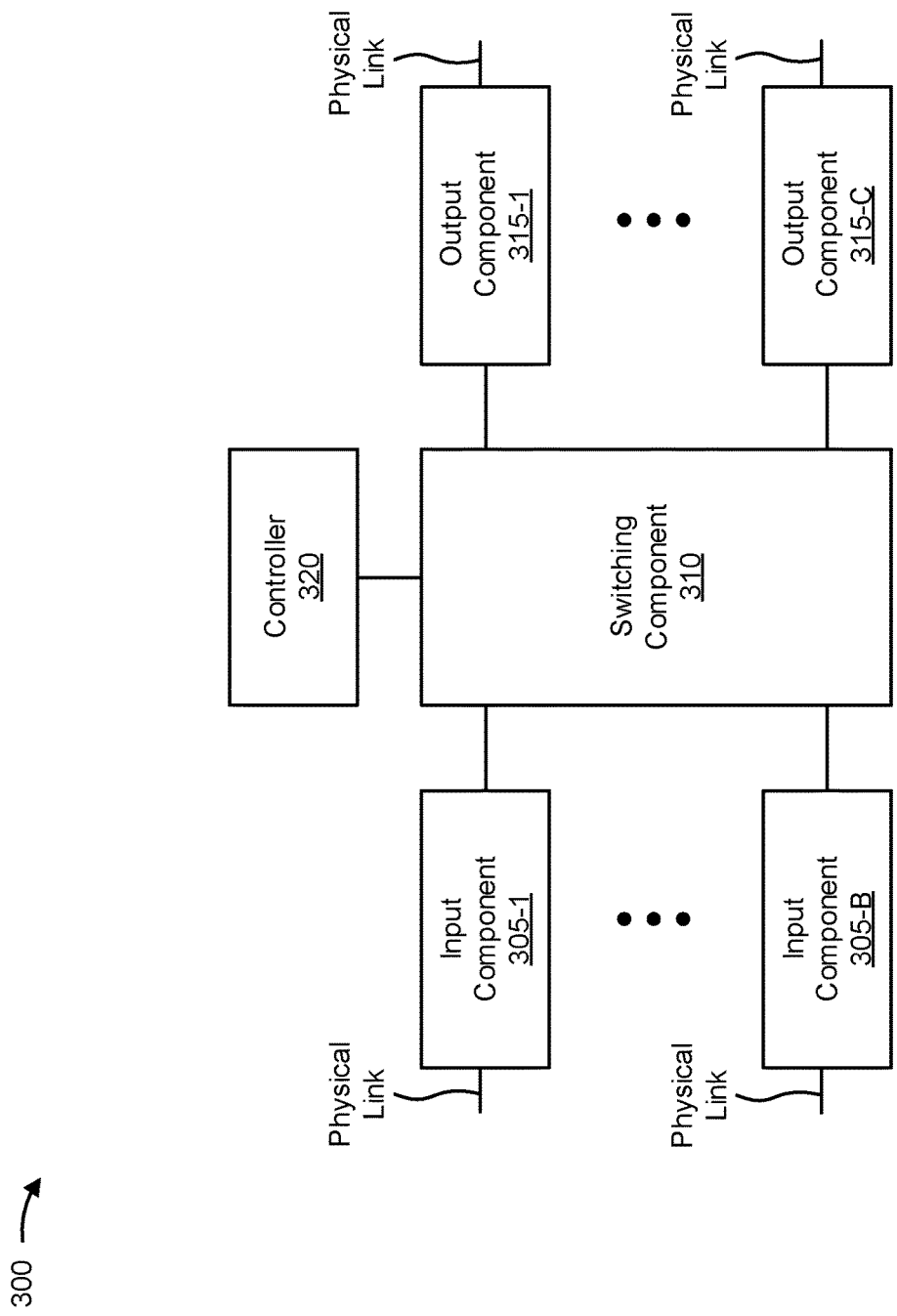
FIG. 3 is a diagram of example components of one or more devices of FIG. 2.

FIG. 3 is a diagram of example components of a device 300. Device 300 may correspond to client device 210 and/or network device 220. In some implementations, client device 210 and/or network device 220 may include one or more devices 300 and/or one or more components of device 300. As shown in FIG. 3, device 300 may include one or more input components 305-1 through 305-B (B≥1) (hereinafter referred to collectively as "input components 305," and individually as "input component 305"), a switching component 310, one or more output components 315-1 through 315-C(C≥1) (hereinafter referred to collectively as "output components 315," and individually as "output component 315"), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., an input/output component may be a combination of input component 305 and output component 315).

Controller 320 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes based on executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
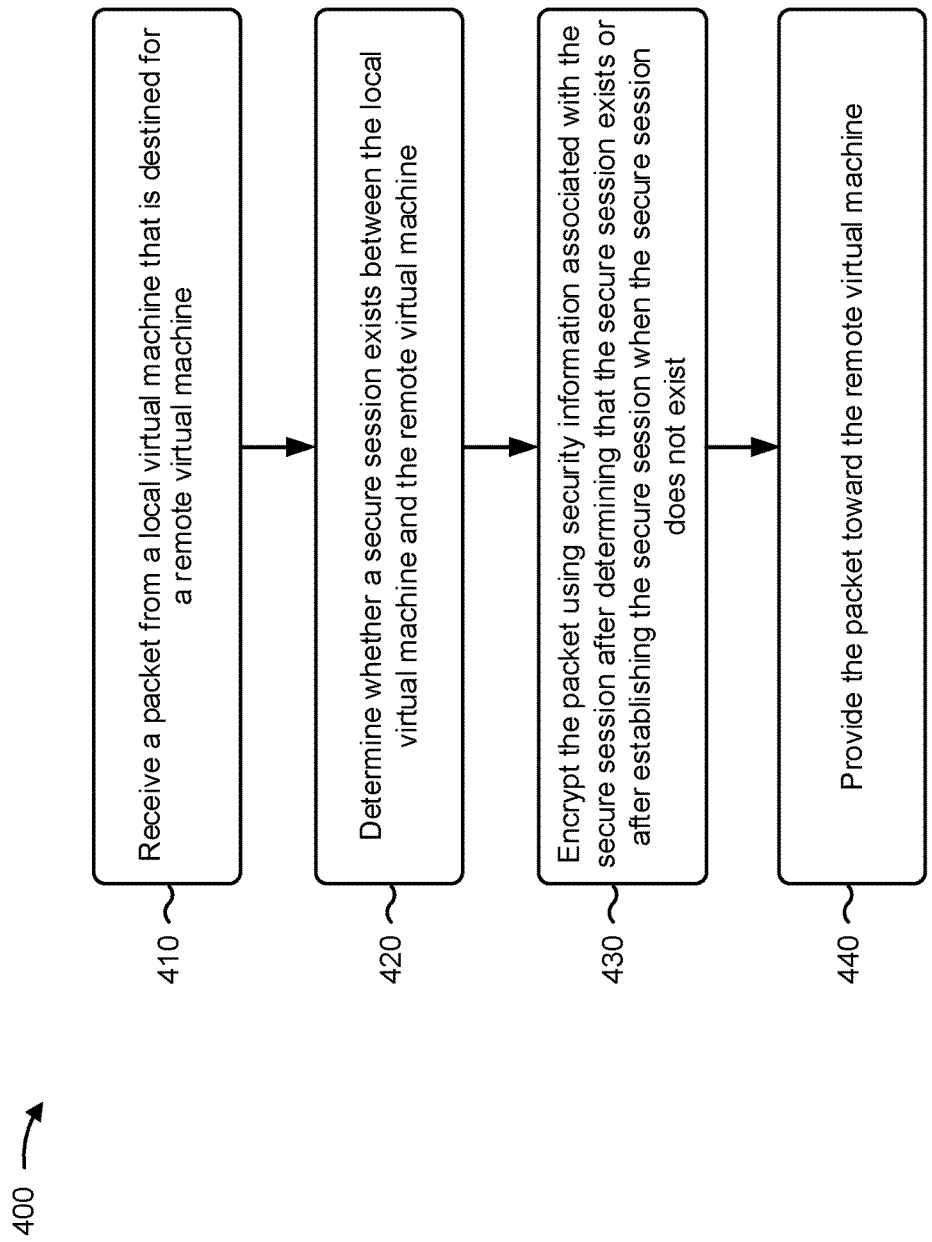
FIG. 4 is a flow chart of an example process for exchanging encrypted traffic between endpoints using an underlying tunneling network.

FIG. 4 is a flow chart of an example process 400 for exchanging encrypted traffic between endpoints using an underlying tunneling network. Specifically, FIG. 4 shows an example relating to processing and/or providing a packet from a local virtual machine toward a remote virtual machine. In some implementations, one or more process blocks of FIG. 4 may be performed by network device 220. In some implementations, one or more process blocks of FIG. 4 may be performed by another device or a group of devices separate from or including network device 220, such as client device 210.

As shown in FIG. 4, process 400 may include receiving a packet from a local virtual machine that is destined for a remote virtual machine (block 410). For example, network device 220 may receive a packet from a local virtual machine (e.g., that network device 220 hosts) that is destined for a remote virtual machine (e.g., that another network device 220 hosts). In some implementations, network device 220 may receive a packet periodically, according to a schedule, based on a local virtual machine providing the packet toward a remote virtual machine, such as via a VNIC associated with the first virtual machine, based on requesting the packet, and/or the like.

In some implementations, a packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via network 230. In some implementations, traffic may refer to a set of packets. In some implementations, a packet may include information that identifies a MAC address of a source of the packet (e.g., a local virtual machine), a MAC address of a destination of the packet (e.g., a remote virtual machine), and/or the like.

In some implementations, network device 220 may receive the packet using a service node associated with network device 220. For example, network device 220 may receive the packet via a virtual port associated with the service node. In some implementations, network device 220 may receive the packet via a packet forwarding component (PFC) of network device 220. For example, a PFC associated with network device 220 may receive a packet from a local virtual machine and the PFC may provide the packet to a service node associated with network device 220.

In some implementations, network device 220 may receive information from a service manager. For example, network device 220 may receive topology information that identifies network devices 220 connected to network 230, virtual machines hosted by network devices 220 on network 230, service nodes associated with network devices 220 on network 230, and/or the like. In some implementations, network device 220 may receive the information from a service manager periodically, according to a schedule, when the service manager detects that network devices 220 and/or virtual machines hosted by network devices 220 become available or become unavailable, and/or the like. In some implementations, a service node associated with network device 220 may receive the information from the service manager.

In this way, network device 220 may receive a packet from a local virtual machine destined for a remote virtual machine prior to determining whether a secure session exists between the local virtual machine and the remote virtual machine.

As further shown in FIG. 4, process 400 may include determining whether a secure session exists between the local virtual machine and the remote virtual machine (block 420). For example, network device 220 may determine whether a secure session exists between the local virtual machine and the remote virtual machine. In some implementations, network device 220 may determine whether a secure session exists prior to providing the packet from the local virtual machine toward the remote virtual machine.

In some implementations, a secure session may include a connection that permits a source and destination virtual machine to exchange encrypted packets such that other virtual machines on the same network devices 220 that are hosting the source and destination virtual machines cannot read the packets. For example, the secure session may include an MKA session between source and destination virtual machines that is associated with an encryption key and/or decryption key that can be used to secure packets between the source and destination virtual machines.

In some implementations, when determining whether a secure session exists between the local virtual machine and the remote virtual machine, network device 220 may perform a lookup of information that identifies whether a secure session exists between a source virtual machine for the packet and a destination virtual machine for the packet. For example, network device 220 may perform a lookup using information identifying MAC addresses of the source and destination virtual machines. Continuing with the previous example, network device 220 may perform a lookup to determine whether an MKA session exists between a local virtual machine associated with network device 220 and a remote virtual machine associated with another network device 220. In some implementations, network device 220 may determine whether a secure session exists based on a result of performing the lookup (e.g., based on whether a result of performing the lookup indicates a match).

In some implementations, when network device 220 determines that a secure session does not exist, network device 220 may perform an action related to establishing the secure session. For example, if network device 220 determines that an MKA session does not exist between the first virtual machine and the second virtual machine, the service node of network device 220 may block the first virtual machine from providing additional packets. Continuing with the previous example, network device 220 may establish an MKA session by using EAPoL to exchange information with another network device 220 related to the local virtual machine and the remote virtual machine. Continuing still with the previous example, after establishing the MKA session, network device 220 may store information identifying a key (e.g., an encryption key and/or a decryption key) derived from a PSK associated with the MKA session and the service node associated with network device 220 may use the key to encrypt the packet, as described in more detail herein.

In some implementations, prior to determining whether a secure session exists between the local virtual machine and the remote virtual machine, network device 220 may perform a lookup of MAC addresses associated with the packet using a source IP address associated with the packet, a destination IP address associated with the packet, and/or the like. For example, network device 220 may perform the lookup to identify a service node associated with a destination and/or source virtual machine of the packet. Continuing with the previous example, network device 220 may perform the lookup to identify a next hop for the packet.

In this way, network device 220 may determine whether a secure session exists between a local virtual machine and remote virtual machine prior to encrypting a packet from the local virtual machine to the remote virtual machine.

As further shown in FIG. 4, process 400 may include encrypting the packet using security information associated with the secure session after determining that the secure session exists or after establishing the secure session when the secure session does not exist (block 430). For example, network device 220 may encrypt the packet using security information. In some implementations, network device 220 may encrypt the packet after determining that the secure session exists or after establishing the secure session when the secure session does not exist.

In some implementations, security information may include information that can be used to encrypt a packet sent from a first virtual machine (e.g., a local virtual machine) to a second virtual machine (e.g., a remote virtual machine) such that other virtual machines cannot read the packet. For example, security information may include an encryption and/or decryption key, a token, and/or the like associated with an MKA session associated with the first and second virtual machines. In some implementations, network device 220 may encrypt the packet using information associated with the packet (e.g., in addition to using the security information to encrypt the packet). For example, network device 220 may encrypt the packet using information that identifies a MAC address of a source virtual machine (e.g., a local virtual machine) and/or a destination virtual machine (e.g., a remote virtual machine) of the packet.

This permits a packet to be encrypted at a layer 2 level (e.g., at a virtual machine level). This increases a security of the packet by preventing other network devices 220 on a path of the packet and/or service nodes associated with the other network devices 220, from reading the packet.

In this way, network device 220 may encrypt the packet prior to providing the packet toward the remote virtual machine.

As further shown in FIG. 4, process 400 may include providing the packet toward the remote virtual machine (block 440). For example, network device 220 may provide the packet. In some implementations, network device 220 may provide the packet toward the remote virtual machine (e.g., hosted on another network device 220). In some implementations, network device 220 may provide thousands, millions, billions, etc. of packets toward a remote virtual machine.

In some implementations, network device 220 may provide the packet via an underlying tunneling network. For example, network device 220 may provide the packet via an underlying tunneling network as a MACsec secured frame or a tunneled MACsec frame. In some implementations, network device 220 may provide the packet via a component of network device 220. For example, a service node associated with network device 220 may provide the packet via a NIC associated with the service node and a NIC port associated with network device 220.

In some implementations, network device 220 may perform another action. For example, network device 220 may send a message indicating that the secure session has been established and that the packet has been provided toward the remote virtual machine (e.g., may provide a message to client device 210). In some implementations, network device 220 may record metrics related to the packet. For example, network device 220 may record metrics related to a size of the packet, or a set of packets, provided toward the remote virtual machine (e.g., whether a size of the packet satisfies a threshold). Additionally, or alternatively, and as another example, network device 220 may record metrics related to a quantity of packets provided toward the remote virtual machine (e.g., whether a quantity of packets satisfies a threshold). In some implementations, network device 220 may generate a report related to packets provided toward a virtual machine (e.g., that includes information identifying metrics related to the packets).

In this way, network device 220 may provide the packet toward the remote virtual machine.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
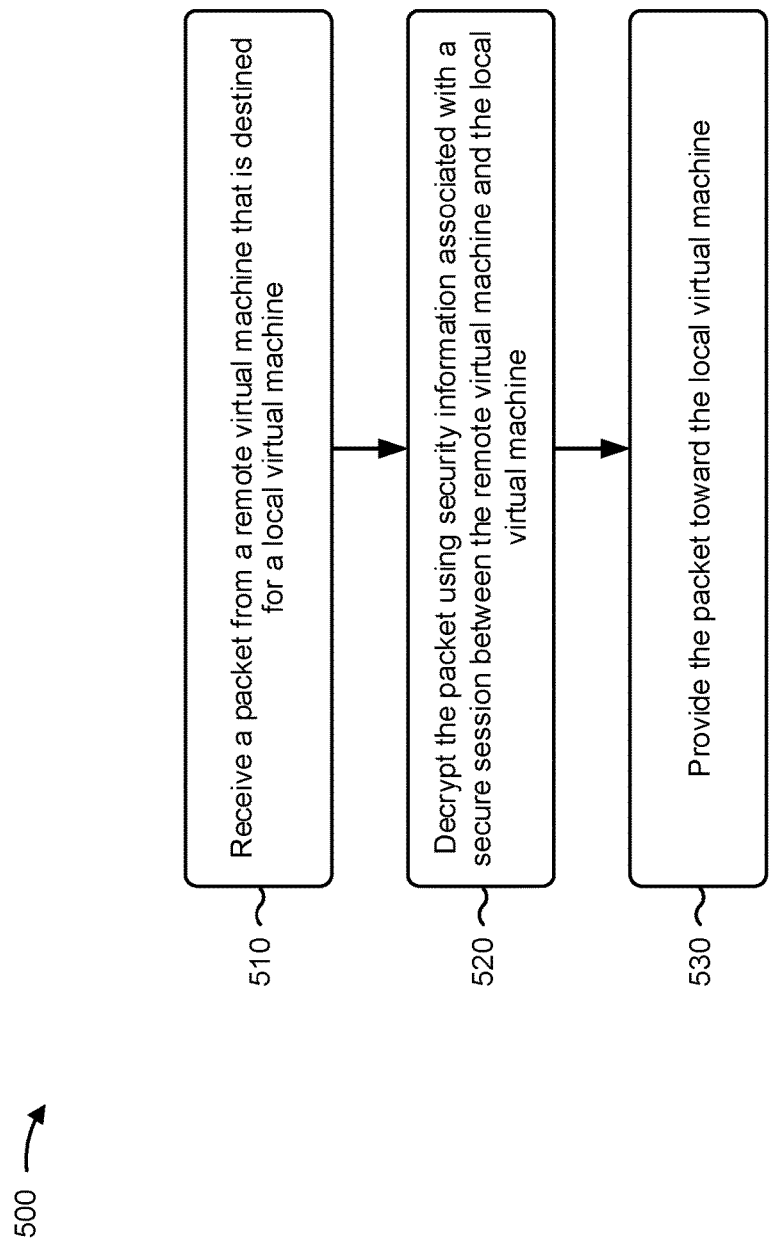
FIG. 5 is a flow chart of an example process for securing end-to-end virtual machine traffic.

FIG. 5 is a flow chart of an example process 500 for securing end-to-end virtual machine traffic. Specifically, FIG. 5 shows an example related to processing and/or providing a packet from a remote virtual machine toward a local virtual machine. For example, where process 400 related to a first network device 220 providing a packet to a second network device 220, process 500 relates to the second network device 220 receiving the packet from the first network device 220. In some implementations, one or more process blocks of FIG. 5 may be performed by network device 220. In some implementations, one or more process blocks of FIG. 5 may be performed by another device or a group of devices separate from or including network device 220, such as client device 210.

As shown in FIG. 5, process 500 may include receiving a packet from a remote virtual machine that is destined for a local virtual machine (block 510). For example, network device 220 may receive a packet. In some implementations, network device 220 may receive a packet from a remote virtual machine (e.g., hosted by another network device 220) that is destined for a local virtual machine (e.g., hosted by network device 220). In some implementations, network device 220 may receive the packet periodically, according to a schedule, when another network device 220 provides the packet, and/or the like. In practice, network device 220 may receive thousands, millions, billions, etc. of packets from another network device 220.

In some implementations, network device 220 may receive a packet via an underlying tunneling network between network device 220 and another network device 220 (e.g., between service nodes of network device 220 and the other network device 220). For example, network device 220 may receive the packet as a MACsec secured frame via an underlying tunneling network between network device 220 and another network device 220. In some implementations, network device 220 may receive the packet via a component, or element, of network device 220. For example, network device 220 may receive the packet via a NIC port of network device 220, a service node of network device 220, and/or a NIC of the service node.

In this way, network device 220 may receive a packet from a remote virtual machine prior to decrypting the packet.

As further shown in FIG. 5, process 500 may include decrypting the packet using security information associated with a secure session between the remote virtual machine and the local virtual machine (block 520). For example, network device 220 may decrypt the packet. In some implementations, network device 220 may decrypt the packet using security information associated with a secure session between the remote virtual machine and the local virtual machine. In some implementations, network device 220 may decrypt thousands, millions, billions, etc. of packets. In this way, network device 220 may process a set of packets that cannot be processed manually or objectively by a human actor.

In some implementations, network device 220 may perform a lookup to identify security information. For example, network device 220 may perform a lookup of MAC addresses for destination and source virtual machines of the packet using information included in a header of the packet. Continuing with the previous example, network device 220 may identify a decryption key derived from a PSK to be used to decrypt the packet when a result of performing the lookup indicates a match.

In this way, network device 220 may decrypt the packet prior to providing the packet toward the local virtual machine.

As further shown in FIG. 5, process 500 may include providing the packet toward the local virtual machine (block 530). For example, network device 220 may provide the packet. In some implementations, network device 220 may provide the packet toward the local virtual machine. In some implementations, network device 220 may provide thousands, millions, billions, etc. of packets.

In some implementations, a service node associated with network device 220 may provide the packet to a PFC associated with network device 220 via a virtual port of the service node. For example, the PFC may provide the packet to the local virtual machine via a VNIC of the local virtual machine.

In some implementations, network device 220 may perform another action. For example, network device 220 may process the packet and/or provide information associated with the packet for display (e.g., via client device 210). Additionally, or alternatively, and as another example, network device 220 may generate a report indicating that the packet was received. Additionally, or alternatively, and as another example, network device 220 may send a message to another network device 220 from which the packet was received to indicate that the packet was received (e.g., the local virtual machine may send a message to the remote virtual machine).

In this way, network device 220 may provide the packet toward the local virtual machine.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
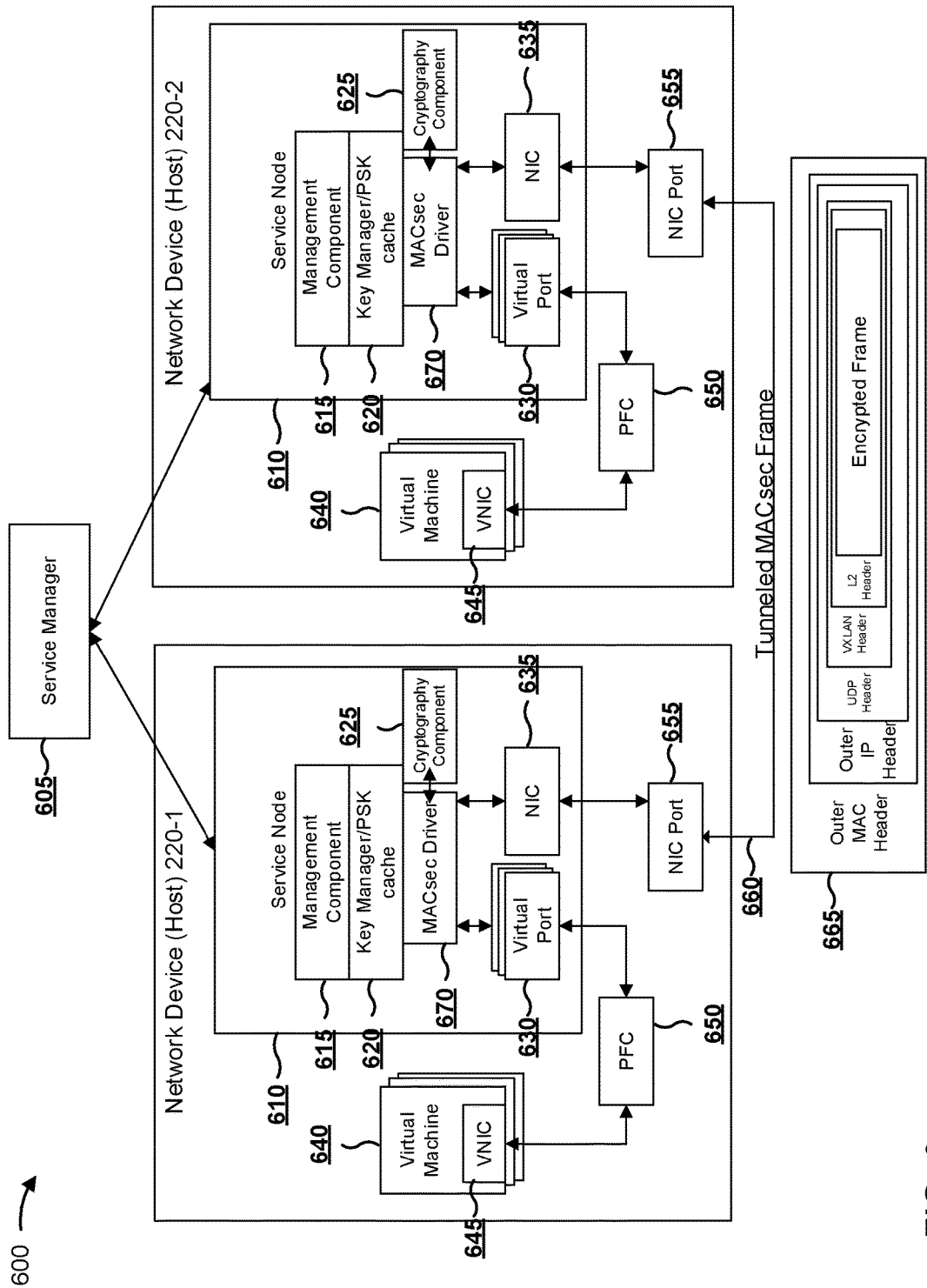
FIG. 6 is a diagram of an example implementation relating to the example process shown in FIG. 4 and/or the example process shown in FIG. 5.

FIG. 6 is a diagram of an example implementation 600 relating to example process 400 shown in FIG. 4 and/or example process 500 shown in FIG. 5. FIG. 6 shows an example system architecture for securing end-to-end virtual machine traffic. As shown in FIG. 6, implementation 600 includes a set of network devices 220 (e.g., a set of hosts), shown as network devices 220-1 and 220-2.

As shown in FIG. 6, and by reference number 605, implementation 600 may include a service manager (e.g., a controller, a software defined network (SDN) controller, etc.). In some implementations, the service manager may receive, provide, store, generate, and/or process information related to a network topology. For example, the service manager may determine network devices 220, virtual machines hosted on network devices 220, service nodes of network devices 220, and/or the like that are available for communication. In some implementations, the service manager may provide information to a service node of network device 220 to update a network topology of network 230 as network devices 220 and/or virtual machines become available or unavailable for communication.

As shown by reference numbers 610, network devices 220-1 and 220-2 may include a service node. In some implementations, the service node may perform various functions related to traffic to and/or from a corresponding network device 220 (e.g., the service node may function like a gateway, a firewall, an intrusion detection device, and/or the like). As shown by reference numbers 615, network devices 220-1 and 220-2 may include a management component (e.g., a management interface, a management daemon, etc.). In some implementations, the management component may receive topology information from the service manager. Additionally, or alternatively, the management component may push information to the key manager/PSK cache (shown by reference number 620) (e.g., information related to a secure session).

As shown by reference numbers 620, network devices 220-1 and 220-2 may include a key manager/PSK cache. For example, the key manager/PSK cache may store security information related to a secure session between a local virtual machine and a remote virtual machine. As shown by reference numbers 625, network devices 220-1 and 220-2 may include a cryptography component. For example, the cryptography component may encrypt traffic provided by network device 220 and/or may decrypt traffic received by network device 220 (e.g., using security information associated with a secure session).

As shown by reference numbers 630, network devices 220-1 and 220-2 may include a virtual port. For example, the service node associated with network device 220 may include a virtual port to provide/receive traffic to/from a set of virtual machines hosted on network device 220. As shown by reference numbers 635, network devices 220-1 and 220-2 may include a NIC. For example, the service node of network device 220 may include a NIC to provide/receive traffic to/from a NIC port of network device 220.

As shown by reference numbers 640, network devices 220-1 and 220-2 may include a set of virtual machines (e.g., may host a set of virtual machines). As shown by reference numbers 645, a virtual machine hosted on network device 220 may include a virtual NIC (VNIC) that permits the virtual machine to provide and/or receive traffic. As shown by reference numbers 650, network devices 220-1 and 220-2 may include a packet forwarding component (PFC). For example, the PFC may provide an outgoing packet from a virtual machine to the service node and/or may provide an incoming packet from the service node to a virtual machine.

As shown by reference numbers 655, network devices 220-1 and 220-2 may include a NIC port. For example, the NIC port may be used by network device 220 to provide and/or receive traffic. As shown by reference number 660, network devices 220-1 and 220-2 may communicate using a tunneled MACsec frame (e.g., exchanged through an underlying tunneling network as a MACsec secured frame). As shown by reference number 665, the tunneled MACsec frame may include various layers of encapsulation, headers, and/or the like. For example, the tunneled frame may include an outer MAC header, an outer IP header, a user datagram protocol (UDP) header, a virtual extensible LAN (VXLAN) header, a layer 2 (L2) header, and/or an encrypted frame (e.g., encrypted using security information associated with a secure session).

As shown by reference numbers 670, the service node may include a MACsec driver that exchanges traffic with various ports of the services node. For example, the MACsec driver may communicate with one or more virtual ports of the service node and/or a NIC of the service node. Additionally, or alternatively, the MACsec driver may determine whether a secure session exists between a local virtual machine and a remote virtual machine. Additionally, or alternatively, the MACsec driver may communicate with a cryptography component (shown by reference number 625) to decrypt and/or encrypt a packet.

As indicated above, FIG. 6 is provided merely as an example. Other examples are possible and may differ from what was described with regard to FIG. 6.

Figure 7:
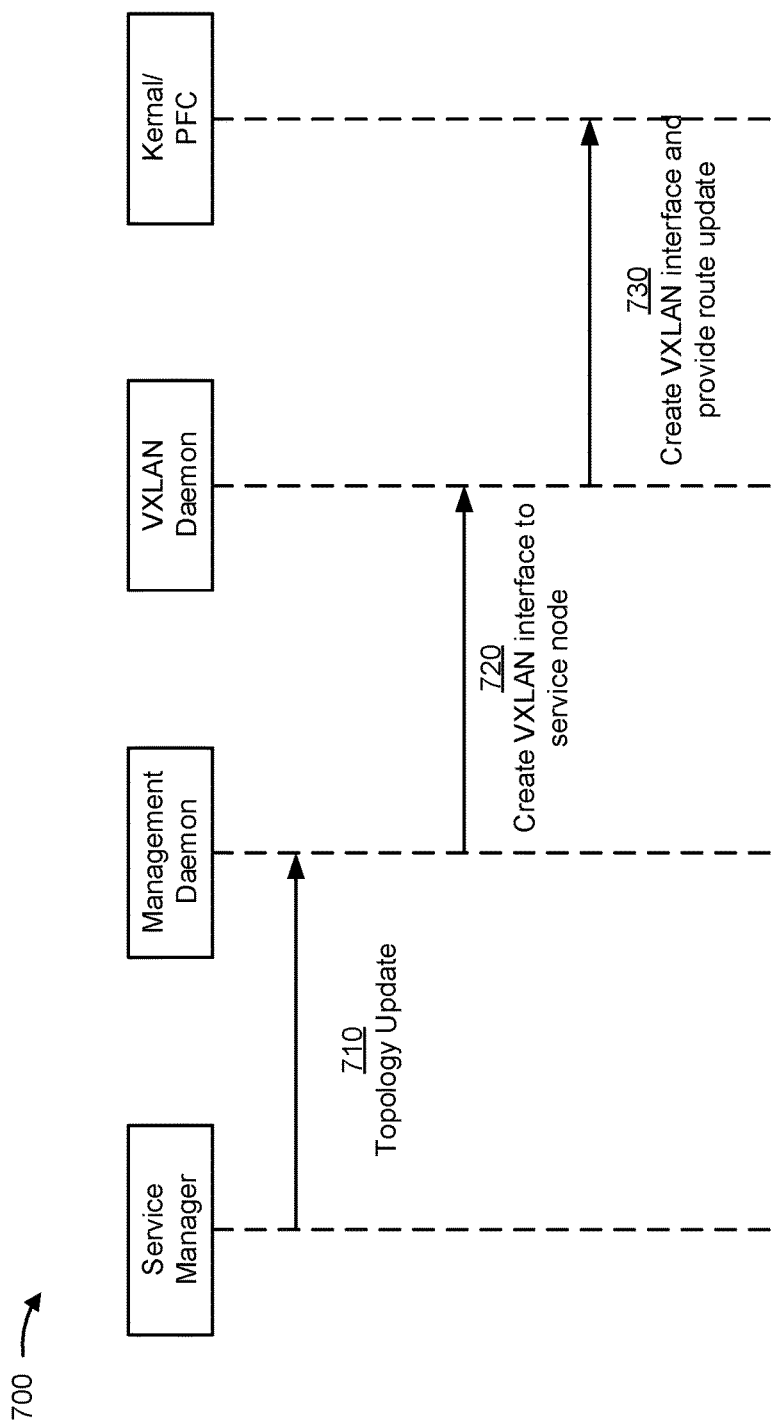
FIG. 7 is a call flow of an example implementation relating to the example process shown in FIG. 4 and/or the example process shown in FIG. 5.

FIG. 7 is a call flow of an example implementation 700 relating to example process 400 shown in FIG. 4 and/or example process 500 shown in FIG. 5. FIG. 7 shows an example of creating a VXLAN interface to permit tunneling of traffic between virtual machines hosted on network devices 220.

As shown in FIG. 7, and by reference number 710, a service manager may provide a topology update to a management daemon (e.g., associated with a service node of network device 220). For example, the service manager may provide a message to the management daemon that includes information indicating that a service node on another network device 220 has been added to the network topology. As shown by reference number 720, the management daemon may provide an indication to a VXLAN daemon to cause the VXLAN daemon to create a VXLAN interface to the service node that was added to the network topology. As shown by reference number 730, the VXLAN daemon may create the VXLAN interface to the added service node and may provide a route update to a kernel of network device 220 and/or a PFC of network device 220. For example, a route update may include information that permits traffic to be routed to the added service node via the created VXLAN interface.

In this way, network device 220 may create a VXLAN interface to permit communication with a virtual machine, a service node, and/or network device 220 that is added to a network topology.

As indicated above, FIG. 7 is provided merely as an example. Other examples are possible and may differ from what was described with regard to FIG. 7.

Figure 8:
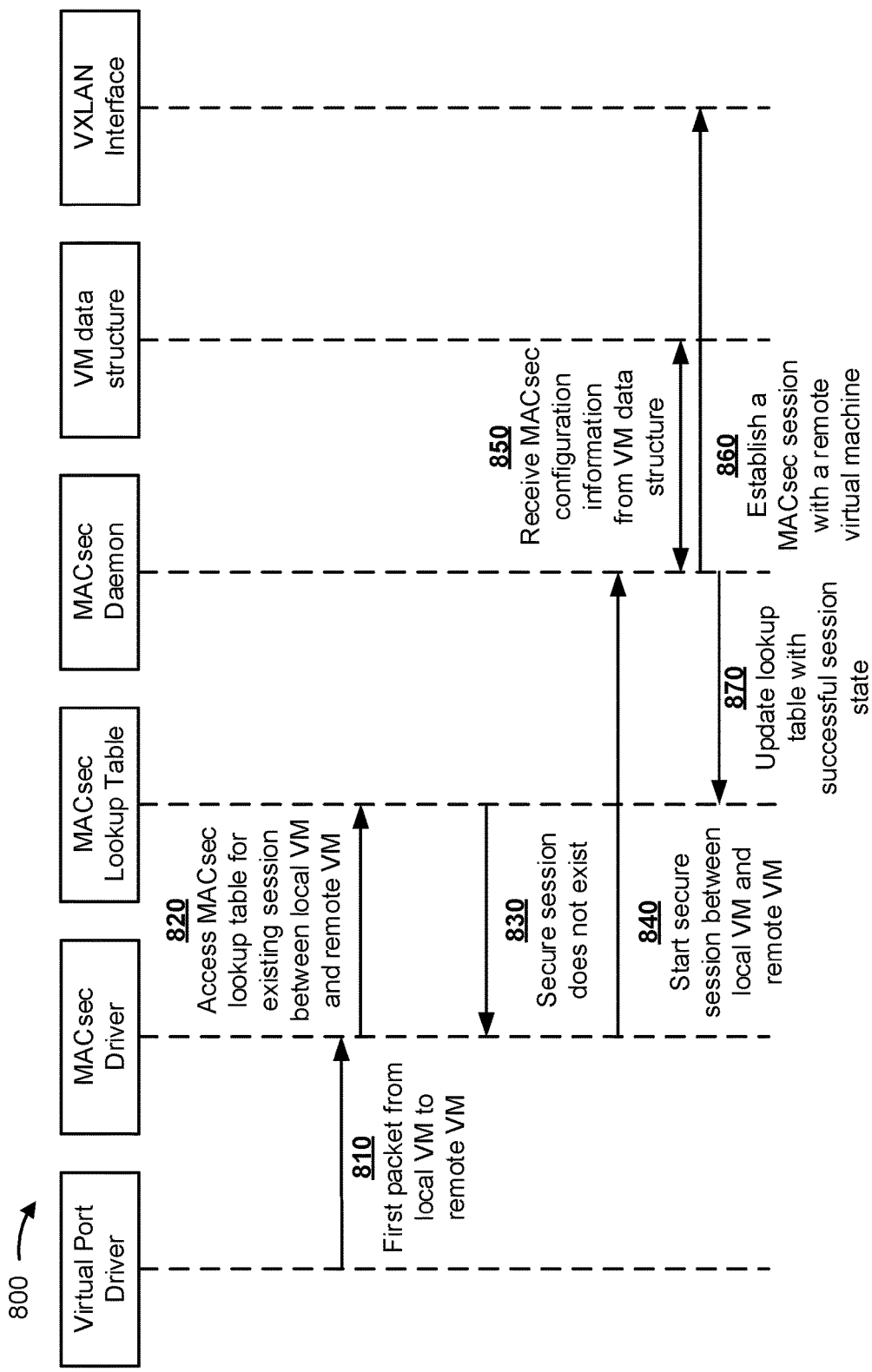
FIG. 8 is a call flow of an example implementation relating to the example process shown in FIG. 4 and/or the example process shown in FIG. 5.

FIG. 8 is a call flow of an example implementation 800 relating to example process 400 shown in FIG. 4 and/or example process 500 shown in FIG. 5. FIG. 8 shows an example of processing a packet that originates from a local virtual machine (VM) and is destined for a remote virtual machine and establishing a secure session between the local virtual machine and the remote virtual machine.

As shown by reference number 810, the first packet from a local virtual machine to a remote virtual machine may be provided from a virtual port driver of network device 220 to a MACsec driver of network device 220. For example, the virtual port driver may be associated with a VNIC of a virtual machine hosted on network device 220 and the MACsec driver may be associated with a service node of network device 220. As shown by reference number 820, the MACsec driver may access a MACsec lookup table (e.g., a data structure) to determine whether a session (e.g., a secure session, an MKA session, etc.) exists between the local virtual machine and the remote virtual machine. For example, the MACsec driver may perform the lookup using information identifying a source MAC address of the packet, a destination MAC address of the packet, and/or the like. In some implementations, the MACsec lookup table may include information that identifies existing secure sessions and corresponding local and remote virtual machines associated with the secure sessions.

In some implementations, prior to determining whether a secure session exists between the local virtual machine and the remote virtual machine, network device 220 may perform a lookup of MAC addresses associated with the packet using a source IP address associated with the packet, a destination IP address associated with the packet, and/or the like. For example, network device 220 may perform the lookup to identify a service node associated with a destination and/or source virtual machine of the packet. Continuing with the previous example, network device 220 may perform the lookup to identify a next hop for the packet.

As shown by reference number 830, the MACsec driver may determine that a secure session does not exist between the local virtual machine and the remote virtual machine (e.g., based on a result of the lookup failing to indicate a match). As shown by reference number 840, the MACsec driver may start a secure session between the local virtual machine and the remote virtual machine. For example, the MACsec driver may cause a MACsec daemon to start the secure session (e.g., by providing a set of instructions to the MACsec daemon). As shown by reference number 850, the MACsec daemon may receive MACsec configuration information (e.g., a PSK, MACsec parameters, etc.) from a virtual machine (VM) data structure. For example, the virtual machine data structure may include MACsec configuration information that identifies a MAC address of the local and/or remote virtual machines that is to be used to establish a secure session between the local and remote virtual machines.

Although a secure session may be described herein as being between virtual machines, a secure session may be described as being between, or associated with, MAC addresses. For example, the secure session may be between service nodes and/or network devices 220 that are functioning on behalf of virtual machines exchanging packets. Continuing with the previous example, the service nodes and/or network devices 220 may use MAC addresses associated with virtual machines hosted by network devices 220 on behalf of the hosted virtual machines to permit an exchange of packets between the virtual machines.

As shown by reference number 860, the MACsec daemon may establish a MACsec session with a remote virtual machine by sending information to a VXLAN interface associated with network device 220 (e.g., information related to an MKA EAPoL). As shown by reference number 870, the MACsec daemon may update the lookup table with information identifying a successful (e.g., existing) session state. In this way, network device 220 may establish a secure session between a local virtual machine and a remote virtual machine.

As indicated above, FIG. 8 is provided merely as an example. Other examples are possible and may differ from what was described with regard to FIG. 8.

Figure 9:
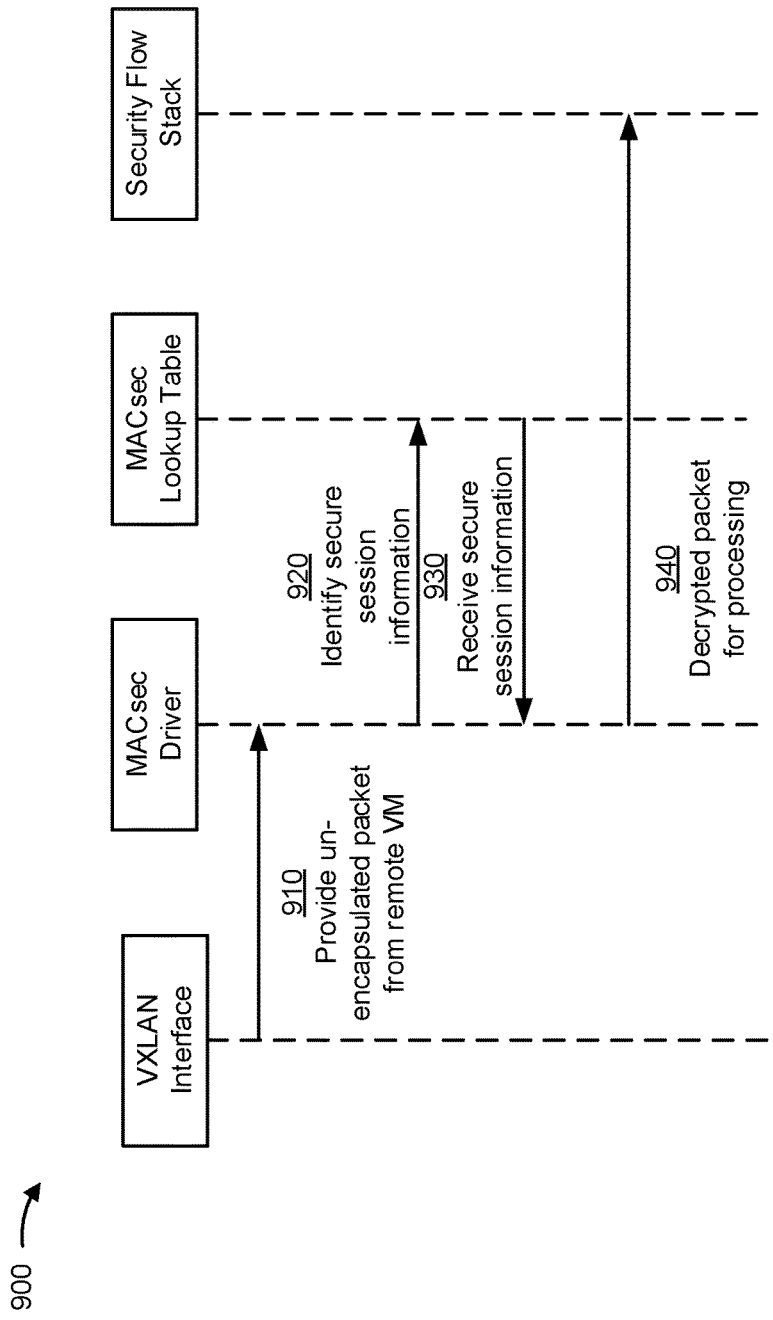
FIG. 9 is a call flow of an example implementation relating to the example process shown in FIG. 4 and/or the example process shown in FIG. 5.

FIG. 9 is a call flow of an example implementation 900 relating to example process 400 shown in FIG. 4 and/or example process 500 shown in FIG. 5. FIG. 9 shows an example of network device 220 processing a packet received from a remote virtual machine (e.g., hosted by another network device 220) that is destined for a local virtual machine hosted by network device 220.

As shown by reference number 910, a VXLAN interface of network device 220 may provide an un-encapsulated packet from a remote virtual machine to a MACsec driver of network device 220. As shown by reference number 920, the MACsec driver may identify secure session information related to a secure session between the remote virtual machine that provided the packet and the local virtual machine to which the packet is destined. For example, the MACsec driver may identify information identifying a session key for the secure session from a MACsec lookup table that includes information identifying session keys, a corresponding secure session, and virtual machines associated with the secure session. In some implementations, the MACsec driver may identify the secure session information by performing a lookup in the MACsec lookup table of information that identifies a secure session between the remote virtual machine and a local virtual machine, information that identifies the remote virtual machine and/or the local virtual machine, and/or the like and may identify the secure session information where a result of the lookup indicates a match.

As shown by reference number 930, the MACsec driver may receive secure session information from the MACsec lookup table. For example, the MACsec driver may receive the information based on a result of a lookup to identify the secure session information indicating a match. In some implementations, the MACsec driver may decrypt the packet using the secure session information (e.g., a session key). As shown by reference number 940, the MACsec driver may provide the decrypted packet to a security flow stack (e.g., a set of components, elements, processes, security layers, and/or the like) for processing. For example, the security flow stack may process the decrypted packet using a set of firewall rules, policies, and/or the like.

In this way, network device 220 may process a packet received from another network device 220 (e.g., a packet received from a remote virtual machine that is destined for a local virtual machine).

As indicated above, FIG. 9 is provided merely as an example. Other examples are possible and may differ from what was described with regard to FIG. 9.

Figure 10:
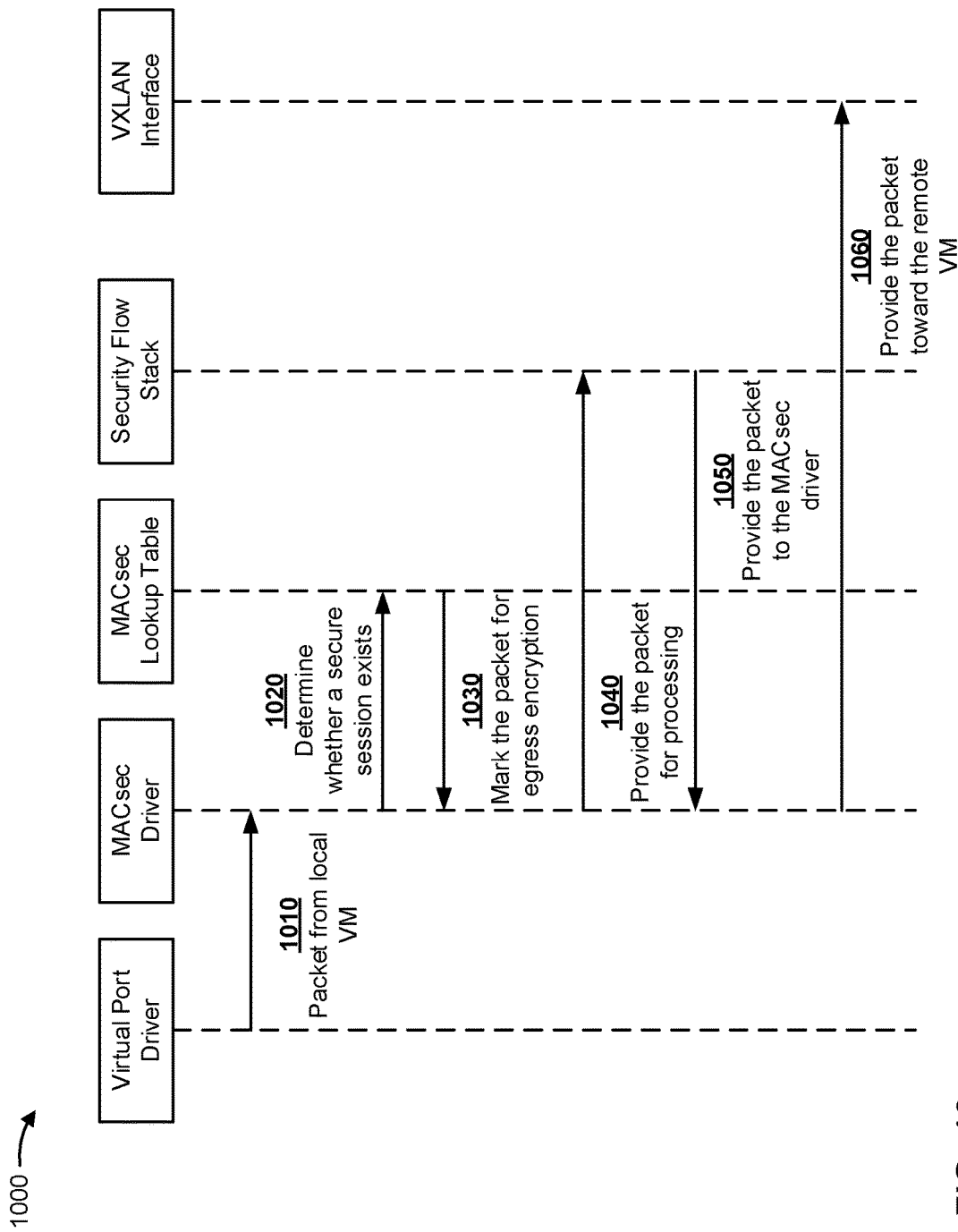
FIG. 10 is a call flow of an example implementation relating to the example process shown in FIG. 4 and/or the example process shown in FIG. 5.

FIG. 10 is a call flow of an example implementation 1000 relating to example process 400 shown in FIG. 4 and/or example process 500 shown in FIG. 5. FIG. 10 shows an example of processing a packet from a local virtual machine that is destined for a remote virtual machine.

As shown by reference number 1010, a virtual port driver associated with network device 220 may provide a packet from a local virtual machine to a MACsec driver associated with network device 220. For example, the packet may be destined for a remote virtual machine hosted by another network device 220. As shown by reference number 1020, the MACsec driver may determine whether a secure session exists between the local virtual machine from which the packet originated and the remote virtual machine to which the packet is destined. For example, the MACsec driver may perform a lookup of information related to the packet (e.g., a source/destination MAC address) using a MACsec lookup table to determine whether an MKA session exists between the local virtual machine and the remote virtual machine (e.g., where a result of the lookup indicates a match between the information related to the packet and information included in the MACsec lookup table).

As shown by reference number 1030, if the MACsec driver determines that a secure session exists between the local virtual machine and the remote virtual machine, the MACsec driver may mark the packet for egress encryption. For example, the MACsec driver may mark the packet to be encrypted using security information related to the existing MKA session (e.g., by updating information in a data structure, including information in a header of the packet, etc.). As shown by reference number 1040, the MACsec driver may provide the packet to a security flow stack for processing. For example, the security flow stack may process the packet using a set of firewall rules, a set of policies, and/or the like, such as to determine whether to filter the packet, to drop the packet, to log the packet, and/or the like. As shown by reference number 1050, the security flow stack may provide the packet to the MACsec driver after processing the packet.

As shown by reference number 1060, the MACsec driver may provide the packet toward the remote virtual machine by providing the packet to a VXLAN interface. In some implementations, if the packet is marked for encryption, the MACsec driver may obtain security information related to the secure session between the local virtual machine and the remote virtual machine and may encrypt the packet using the security information. In this way, network device 220 may encrypt a packet destined for a remote virtual machine using security information related to a secure session between a local virtual machine and the remote virtual machine.

As indicated above, FIG. 10 is provided merely as an example. Other examples are possible and may differ from what was described with regard to FIG. 10.

Figure 11:
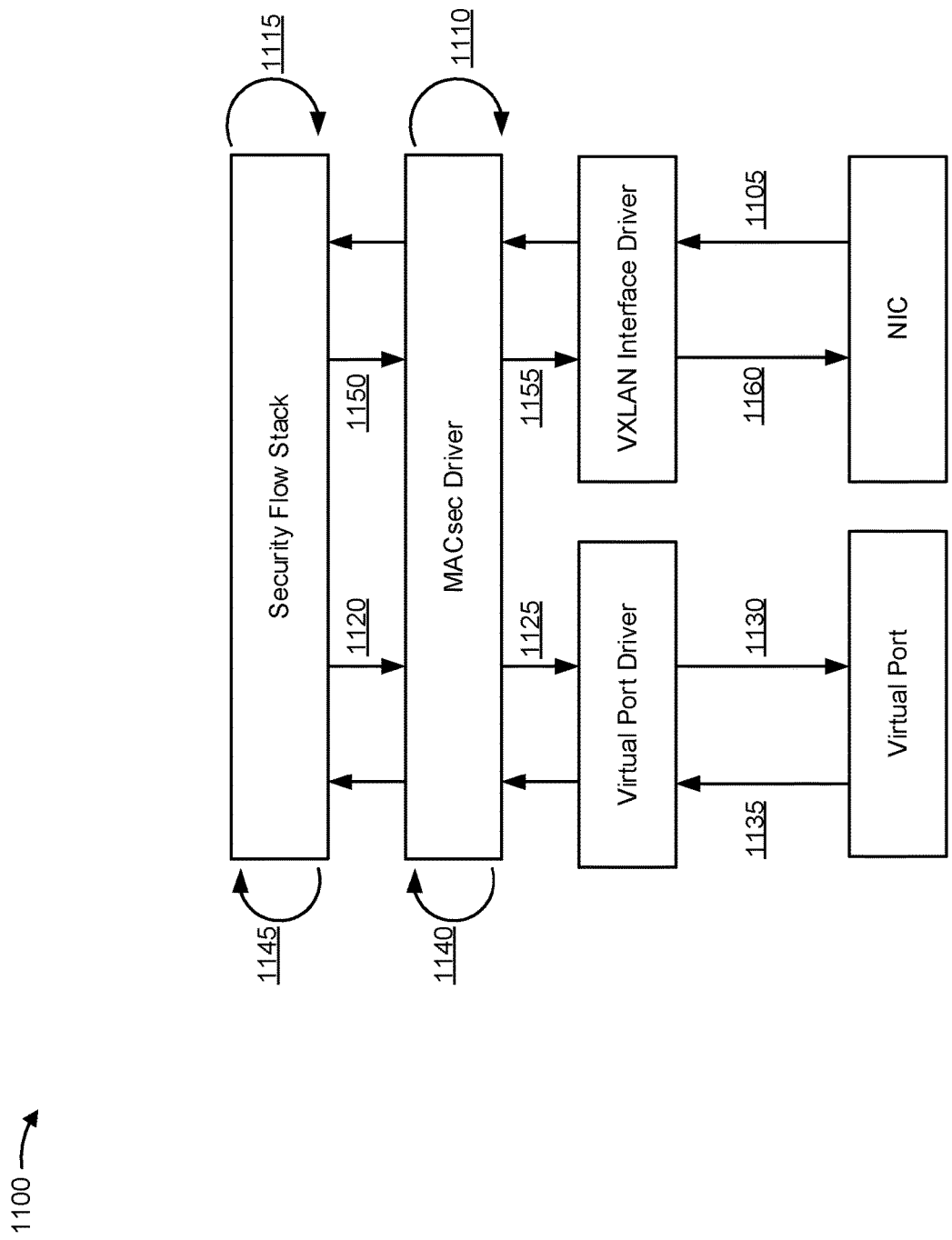
FIG. 11 is a diagram of an example implementation relating to the example process shown in FIG. 4 and/or the example process shown in FIG. 5.

FIG. 11 is a diagram of an example implementation 1100 relating to example process 400 shown in FIG. 4 and/or example process 500 shown in FIG. 5. FIG. 11 shows an example of processing an ingress packet from a remote virtual machine (e.g., destined for a local virtual machine) and processing an egress packet from a local virtual machine (e.g., destined for a remote virtual machine).

As shown by reference number 1105, network device 220 may receive a packet via a VXLAN interface driver (e.g., from a NIC associated with a service node of network device 220). For example, the packet may be received from a remote virtual machine (e.g., hosted on another network device 220) and may be destined for a local virtual machine (e.g., hosted on network device 220). In some implementations, the VXLAN interface driver may provide the packet to a MACsec driver associated with network device 220. As shown by reference number 1110, the MACsec driver may process the packet. For example, the MACsec driver may decrypt an encrypted packet received from the remote virtual machine (e.g., using security information associated with a secure session between the remote virtual machine and the local virtual machine).

In some implementations, after processing the packet, the MACsec driver may provide the packet to a security flow stack for further processing. As shown by reference number 1115, the security flow stack may process the packet. For example, the security flow stack may process the packet using a set of rules (e.g., firewall rules, policies, etc.). For example, the security flow stack may filter the packet, determine a route for the packet, drop the packet, log the packet, and/or the like based on processing the packet.

As shown by reference number 1120, the security flow stack may provide the processed packet to the MACsec driver. As shown by reference number 1125, the MACsec driver may provide the packet to a virtual port driver associated with network device 220. As shown by reference number 1130, the virtual port driver may provide the packet (e.g., a decrypted packet) toward the local virtual machine (e.g., via a virtual port of a service node that corresponds to a VNIC of the local virtual machine).

As shown by reference number 1135, the virtual port driver may receive a packet from the local virtual machine (e.g., an un-encrypted packet destined for a remote virtual machine). In some implementations, the virtual port driver may provide the packet to the MACsec driver. As shown by reference number 1140, the MACsec driver may process the packet. For example, the MACsec driver may determine whether an MKA session exists between the local virtual machine that provided the packet and the remote virtual machine to which the packet is destined. In some implementations, the MACsec driver may establish a secure session (e.g., an MKA session) between the local virtual machine and the remote virtual machine if one does not exist. Additionally, or alternatively, the MACsec driver may mark the packet for encryption (e.g., based on identifying an existing MKA session between the local virtual machine and the remote virtual machine or based on establishing an MKA session). In some implementations, the MACsec driver may provide the packet to the security flow stack for processing after marking the packet for encryption.

As shown by reference number 1145, the security flow stack may process the packet. For example, the security flow stack may process the packet using a set of firewall rules, a set of policies, and/or the like. In some implementations, the security flow stack may filter the packet, drop the packet, log the packet, and/or the like based on processing the packet. As shown by reference number 1150, the security flow stack may provide the packet to the MACsec driver. In some implementations, the MACsec driver may encrypt the packet after receiving the packet. For example, the MACsec driver may encrypt the packet using security information associated with a secure session (e.g., an MKA session) between the local virtual machine and the remote virtual machine.

As shown by reference number 1155, the MACsec driver may provide the packet (e.g., an encrypted packet) to the VXLAN interface driver. As shown by reference number 1160, the VXLAN interface driver may provide the packet toward the remote virtual machine after receiving the packet from the MACsec driver (e.g., via a NIC of a service node associated with network device 220).

In this way, network device 220 may process a packet from a local virtual machine that is destined for a remote virtual machine.

As indicated above, FIG. 11 is provided merely as an example. Other examples are possible and may differ from what was described with regard to FIG. 11.

Some implementations, described herein, provide a network device (e.g., a host) that is capable of securing traffic between virtual machines on different network devices (e.g., at layer 2). In this way, the network device may provide end-to-end network security between virtual machines associated with the same tenant network or associated with different tenant networks. This improves security between virtual machines by permitting traffic to be secured as the traffic is exchanged between virtual machines. Further, this permits virtual machines associated with different tenants to be securely hosted on the same network device.

Although some implementations were described with respect to a virtual machine, the implementations apply equally to other types of endpoints that can exchange traffic. For example, the implementations apply equally to a container, an application, a service, a computing resource, a cloud endpoint, and/or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
receive a packet from a first endpoint that is destined for a second endpoint, the first endpoint being hosted on the device;
determine whether a secure session exists between the first endpoint and the second endpoint,
the secure session permitting encrypted traffic to be exchanged between the first endpoint and the second endpoint;
process the packet using a set of rules after determining whether the secure session exists between the first endpoint and the second endpoint;
encrypt the packet using security information associated with the secure session after:
determining that the secure session exists, or
establishing the secure session when the secure session does not exist; and
provide the packet toward the second endpoint after encrypting the packet.

2. The device of claim 1, where the one or more processors are further to:
receive another packet from the second endpoint,
the other packet being destined for the first endpoint;
decrypt the other packet using the security information associated with the secure session; and
provide the other packet toward the first endpoint after decrypting the packet.

3. The device of claim 2, where the one or more processors are further to:
process the other packet using the set of rules after decrypting the packet; and
where the one or more processors, when providing the other packet, are to:
provide the other packet toward the second endpoint after processing the other packet.

4. The device of claim 1, where the secure session is a media access control (MAC) security (MACsec) key agreement (MKA) session.

5. The device of claim 1, where the one or more processors are further to:
mark the packet for encryption; and
where the one or more processors, when processing the packet using the set of rules, are to:
process the packet using the set of rules after marking the packet for encryption.

6. The device of claim 1, where the one or more processors, when providing the packet toward the second endpoint, are to:
provide the packet toward the second endpoint via an underlying tunneling network between the device and another device,
the packet being provided as an encrypted packet.

7. The device of claim 1, where the one or more processors are further to:
receive information identifying a network topology of a network,
the network topology including the device and another device; and
establish the secure session after receiving the information identifying the network topology.

8. A non-transitory computer-readable medium storing instructions, the instructions comprising:
one or more instructions that, when executed by one or more processors, cause the one or more processors to:
receive a packet from a first endpoint that is destined for a second endpoint,
the first endpoint being local to a device,
the second endpoint being remote to the device;

determine whether a secure session exists between the first endpoint and the second endpoint,
the secure session being associated with security information that is to be used to encrypt the packet;
process the packet using a set of rules prior to encrypting the packet and after determining whether the secure session exists between the first endpoint and the second endpoint;
encrypt the packet using the security information associated with the secure session after processing the packet using the set of rules; and
provide the packet toward the second endpoint after encrypting the packet,
the packet being provided toward the second endpoint via an underlying tunneling network between the device and another device hosting the second endpoint.

9. The non-transitory computer-readable medium of claim 8, where the one or more instructions, that cause the one or more processors to receive the packet, cause the one or more processors to:
receive the packet via a node hosted on the device, the node to:
determine whether the secure session exists,
process the packet using the set of rules, or
encrypt the packet.

10. The non-transitory computer-readable medium of claim 8, where the one or more instructions, when executed by the one or more processors, further cause the one or more processors to:
receive another packet from the second endpoint;
decrypt the other packet after receiving the other packet from the second endpoint; and
provide the other packet toward the first endpoint after decrypting the other packet.

11. The non-transitory computer-readable medium of claim 8, where the one or more instructions, that cause the one or more processors to encrypt the packet, cause the one or more processors to:
encrypt the packet using information identifying the first endpoint or the second endpoint; and
where the one or more instructions, that cause the one or more processors to provide the packet, cause the one or more processors to:
provide the packet after encrypting the packet.

12. The non-transitory computer-readable medium of claim 8, where the underlying tunneling network is associated with exchanging tunneled media access control (MAC) security (MACsec) frames.

13. The non-transitory computer-readable medium of claim 8, where the one or more instructions, when executed by the one or more processors, further cause the one or more processors to:
decrypt another packet received from the second endpoint;
process the other packet using the set of rules after decrypting the other packet; and
provide the other packet toward the first endpoint after processing the other packet.

14. The non-transitory computer-readable medium of claim 8, where the one or more instructions, when executed by the one or more processors, further cause the one or more processors to:
record a set of metrics related to the packet after providing the packet toward the second endpoint.

15. A method, comprising:
receiving, by a device, a packet from a first endpoint that is destined for a second endpoint,
the first endpoint being hosted on the device,
the second endpoint being hosted on another device;
determining, by the device, whether a secure session exists between the first endpoint and the second endpoint,
the secure session permitting encrypted traffic to be exchanged between the first endpoint and the second endpoint;
marking, by the device, the packet for encryption after determining whether the secure session exists between the first endpoint and the second endpoint,
the packet to be encrypted using security information associated with the secure session;
processing, by the device, the packet using a set of rules after marking the packet for encryption;
encrypting, by the device, the packet using the security information associated with the secure session after processing the packet using the set of rules and after:
determining that the secure session exists, or
establishing the secure session when the secure session does not exist; and
providing, by the device, the packet toward the second endpoint after encrypting the packet,
the packet to be provided via an underlying tunneling network between the device and the other device.

16. The method of claim 15, further comprising:
establishing the secure session after determining whether the secure session exists,
storing the security information associated with the secure session after establishing the secure session; and
where encrypting the packet comprises:
providing the packet toward the second endpoint after storing the security information.

17. The method of claim 15, further comprising:
receiving information that identifies a network topology; and
establishing the secure session after receiving the information.

18. The method of claim 15, further comprising:
receiving another packet from the second endpoint,
the other packet being destined for the first endpoint;
performing a lookup to determine the security information associated with the secure session between the first endpoint and the second endpoint after receiving the other packet; and
decrypting the other packet using the security information after performing the lookup.

19. The method of claim 15, further comprising:
performing a lookup using information related to the first endpoint or the second endpoint; and
where determining whether the secure session exists comprises:
determining whether the secure session exists based on a result of performing the lookup.

20. The method of claim 15, further comprising:
generating a report related to the packet after providing the packet toward the second endpoint.

* * * * *